(No Model.) 2 Sheets—Sheet 1.

N. J. MOEHN.
COUPLING FOR PIPE JOINTS.

No. 583,069. Patented May 25, 1897.

Witnesses.

Inventor.
Nicholas J. Moehn,
By Benedick and Morsell.
Attorneys.

THE NORRIS PETERS CO., PHOTO-LITHO., WASHINGTON, D. C.

(No Model.) 2 Sheets—Sheet 2.
N. J. MOEHN.
COUPLING FOR PIPE JOINTS.
No. 583,069. Patented May 25, 1897.
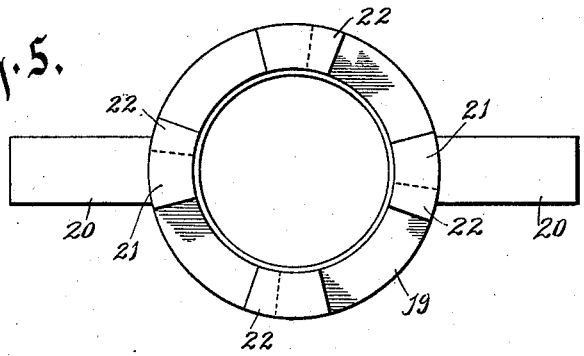
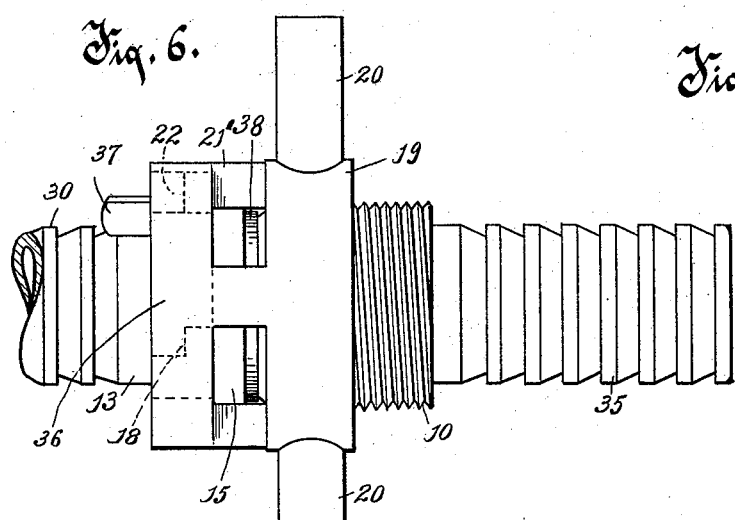
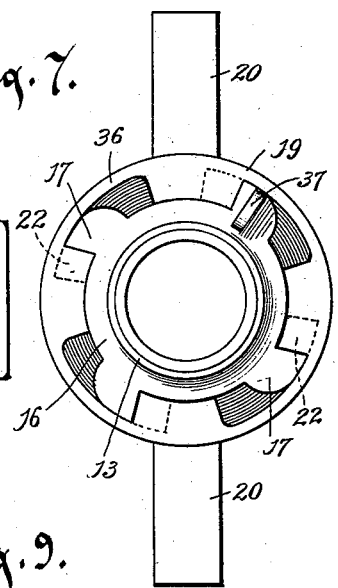
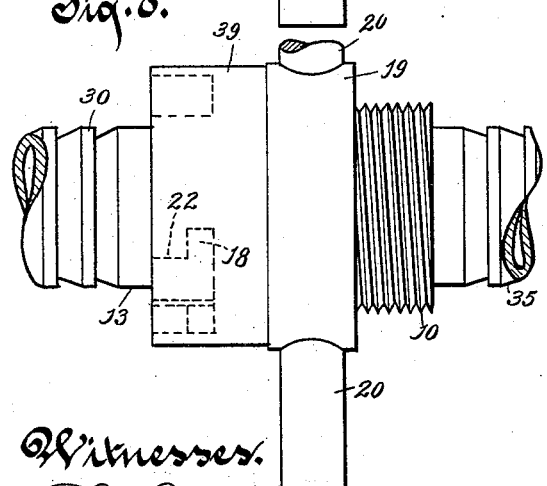
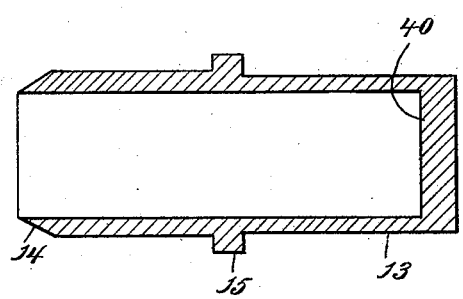
Witnesses. Inventor.
Nicholas J. Moehn,
By Benedict & Morsell
Attorneys.

UNITED STATES PATENT OFFICE.

NICHOLAS J. MOEHN, OF MILWAUKEE, WISCONSIN.

COUPLING FOR PIPE-JOINTS.

SPECIFICATION forming part of Letters Patent No. 583,069, dated May 25, 1897.

Application filed February 19, 1896. Serial No. 579,865. (No model.)

*To all whom it may concern:*

Be it known that I, NICHOLAS J. MOEHN, of Milwaukee, in the county of Milwaukee and State of Wisconsin, have invented a new and useful Improvement in Couplings for Pipe-Joints, of which the following is a description, reference being had to the accompanying drawings, which are a part of this specification.

My invention has relation to improvements in couplings for pipe-joints.

The device is particularly adapted to be used for the purpose of connecting the flexible tubing between railway-cars with the ends of the metallic steam-pipes, and also for connecting the flexible sections of hose used for other purposes.

The objects are to provide a simple form of construction for adapting the coupling to be readily connected and disconnected. The coupling is designed to be of such form that the engaging parts thereof will be entirely closed, so as to be effectually protected against injury, which is particularly liable to occur in a fireman's hose, which is necessarily required to be dragged over the ground and otherwise exposed to injury.

With the above main objects in view the invention consists of the devices and parts, or their equivalents, as hereinafter more fully set forth.

Figure 1:
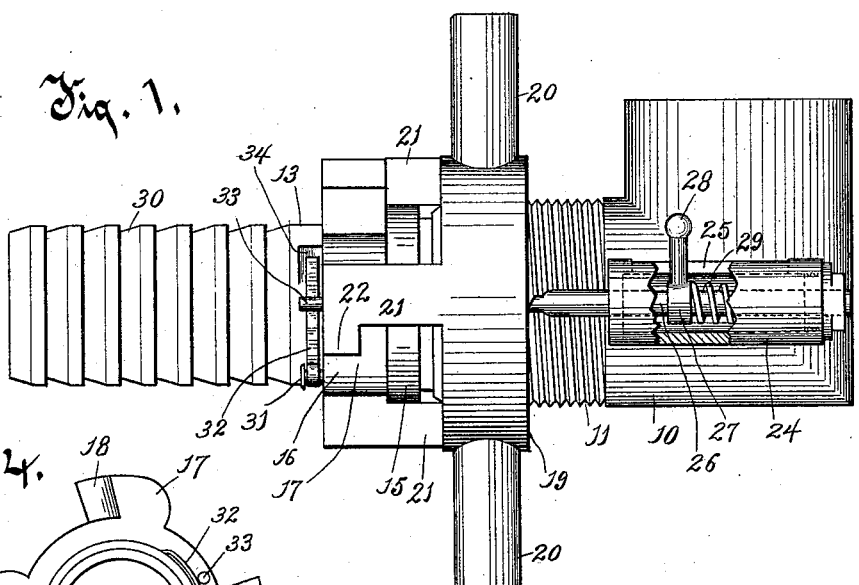
Figure 4:
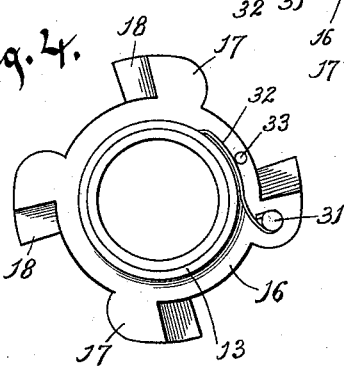
Figure 2:
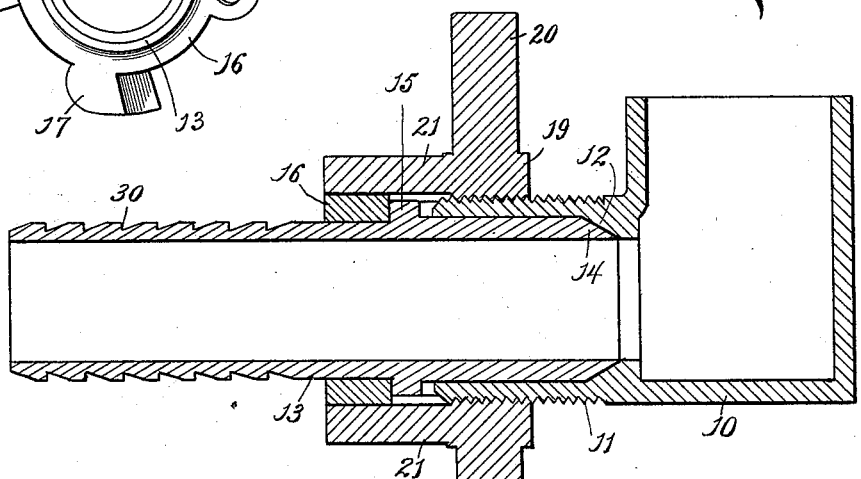
Figure 3:
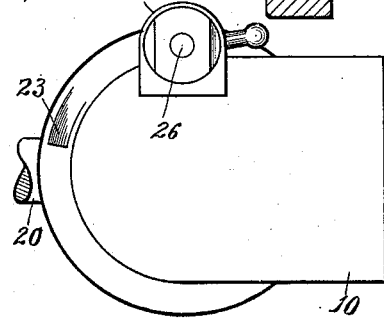

In the accompanying drawings, Figure 1 is an elevation of the form of the device especially adapted for use for the purpose of connecting the flexible tubing between railway-cars with the ends of the main metallic steam-pipes, a part being broken away for convenience of illustration. Fig. 2 is a longitudinal sectional view of Fig. 1. Fig. 3 is an end view. Fig. 4 is a detail elevation of the locking-collar. Fig. 5 is a detail elevation of the locking-nut. Fig. 6 is an elevation of the form of device especially adapted for connecting the joints of a fireman's hose or of an ordinary hose, the figure also illustrating a modification in the arrangement of the adjusting-nut. Fig. 7 is an end view of Fig. 6. Fig. 8 is a similar view to Fig. 6, showing another modification in the locking-nut; and Fig. 9 is a detail view of one of the sections of that coupling which is applied to an end car, the locking-collar being omitted.

Referring particularly to Figs. 1 to 5 of the drawings, the numeral 10 indicates one section of the coupling, preferably of angular form. The outer end of this coupling is adapted to be connected to the main metallic pipe of a car. The opposite end of this section of the coupling is provided with exterior threads 11 and interiorly is formed with a conical seat 12.

The other section of the coupling is indicated by the numeral 13. The inner end of this section is made conical or tapered, as indicated at 14, in order to adapt it to fit the conical seat 12. Intermediate its ends this section is provided with an annular shoulder 15. Adapted to surround the section 13 and to rest against the shoulder 15 thereof is a locking-collar 16. This collar is formed or provided at its edge or circumference with a series of L-shaped lugs 17, one stem 18 of each lug being disposed circumferentially of the edge of the collar.

Engaging the threads 11 of the section 10 is a locking-nut 19. This nut is provided with laterally-projecting arms or handles 20 20 for convenience in turning said nut; also, projecting from the nut longitudinally are a series of projections 21, forming unthreaded portions which extend toward the telescoping section, said projections provided with shoulders 22. The opposite face of the nut is provided with a notch 23.

Exteriorly the section 10 is formed or provided with a casing 24, said casing having an elongated slot 25 in its top. Disposed in the casing and projecting through the end thereof is a dog 26. Within the casing this dog is encircled by a rigid collar 27, which is provided with a finger-piece or handle 28, which projects through the elongated slot 25. Confined between this collar and the end of the casing and encircling the dog is a coiled spring 29. The outer end of the section 13 is provided for a desired distance with a series of ridges 30, to which is adapted to be coupled the flexible tubing, (not shown,) which extends over to a similar coupling for connecting up to the metallic steam-pipe of the other car.

In adjusting the parts together the conical end of the section 13 is passed into the bore of the section 10, so that said conical end will bear against the complementary conical seat 12. Care should be taken to have the loose collar 16 in such position on the section 13 that the lugs 17 will pass between the projections 21 of the nut. The handles of the nut are then grasped and the nut turned so as to cause the shoulders 22 of the projections 21 to engage the parts 18 of the lugs 17. This engagement will cause the loose collar to be tightly brought against the annular shoulder 15, and thereby tightly wedge the tapered or conical end of section 13 against its conical seat 12. By this construction it will be obvious that the joint between the two sections is of such a nature as to absolutely guard against leakage of steam, and at the same time when wear occurs between the parts this can be readily compensated for by turning the locking-nut, and thus drawing the section 13 farther inward against its seat.

In uncoupling it is of course only necessary to turn the nut in an opposite direction and far enough to bring the shoulders 22 out of engagement with the stems. In thus turning the nut it may happen that the frictional contact of the shoulders with said stem 18 will be sufficient to turn the loose collar a limited distance, and thus serve to prevent the complete disengagement of the shoulders from the stems. To guard against this, I provide the face of the loose collar 16 with a projecting pin 31, to which one end of a flat spring 32 is attached. Another pin 33 bears against this spring and holds its free end in contact with the surface of the section 13. Said section 13 is also provided with a notch 34, which notch is so disposed thereon that should the loose collar be carried around with the shoulders 22 the end of said flat spring will engage the notch 34, and thereby impart a reverse turn to the loose collar, so that the shoulders 22 are no longer prevented from clearing the stems of the lugs 17.

The spring-actuated dog or bolt 26 is provided for the purpose of enabling a person to uncouple the sections in the darkness, when it is impossible to see whether the locking-nut has been properly adjusted or turned so as to bring the shoulders 22 out of line with the stems 18. By employing this spring-actuated dog or bolt and the notch 23 in the face of the nut I am enabled to successfully provide for this. The notch 23 is so located that when the nut has been turned a sufficient distance to clear the shoulders 22 from the stems 18 then the notch 23 will be in alinement with the outer end of the dog, and by reason of the coiled spring 29 said dog will be forced into engagement with the notch and the nut thereby prevented from being further turned. As the shoulders 22 are then out of alinement with the stems 18, it is evident that the section 13 can be readily withdrawn without impediment or obstruction.

In Figs. 6 and 7 my coupling is shown arranged as a coupling for a fireman's hose or for an ordinary hose. This differs from the ordinary form merely in providing the threaded portion of the section 10 with a straight extension 35, said extension provided with a series of ridges to which one section of the flexible hose may be coupled, the other section of said hose being coupled to the part 13. In this form also is shown a modification in the locking-nut 19, wherein instead of separate fingers 21 the nut is provided with a cylindrical extension 21'. The outer end 36 of this cylinder is provided upon its inner surface with the L-shaped shoulders 22, which are adapted to engage with the L-shaped lugs 17 18 of the loose collar. It will be seen that by providing this cylindrical casing, when the shoulders and lugs are in locking engagement, the loose collar is drawn into the cylindrical extension, and the engaging shoulders and lugs are thus thoroughly protected from injury, the cylindrical extension forming a protecting-casing and presenting a smooth exterior surface, thereby permitting the hose to be dragged along the ground without danger of the engaging shoulders and lugs being struck by any obstacle and thereby broken or damaged. For the purpose of securing lightness and effecting a saving in metal the cylindrical extension may be provided with a series of openings, as clearly shown. This modified form also contemplates the omission entirely of the spring-actuated dog or bolt 26 and its casing 24, and also the omission of the flat spring 32 and the notch 34, which said spring engages. A hand-grasp 37 is provided for the purpose of turning the locking-collar 16, so that the stems thereof may be made to engage with or be disengaged from the shoulders 22, thereby enabling the locking and unlocking to be readily effected by turning both the nut and collar together, if desired. It may perhaps in practice be found desirable to provide a packing back of the annular shoulder 15. Such a packing is shown in Fig. 6 and is indicated by the numeral 38.

In Fig. 8 is shown another slight modification in the arrangement of the locking-nut, which differs from Fig. 6 only in the respect that the cylindrical extension is a solid cylinder, as indicated by 39, instead of a cylindrical extension having openings therein, as in the construction of Fig. 6.

Fig. 9 shows the formation of the section 13 when it forms a terminal, or is the section adapted for the end car of a train. This section is provided with a closed end 40 to prevent the escape of the steam.

What I claim as my invention, and desire to secure by Letters Patent, is—

1. In a pipe-coupling, the combination, of a section provided with threads, another section telescoping into the first-named section and provided with an exterior shoulder, a locking-nut engaging the threads of the first-named section, said nut formed or provided with a cylindrical extension, which extension is provided near its outer end, upon its interior surface, with one or more L-shaped shoulders, and a locking-collar arranged on the telescoping section against the exterior shoulder thereof, said collar provided at its outer edge with one or more L-shaped lugs adapted to be engaged by the L-shaped shoulders of the nuts, and when thus engaged to be drawn within the cylindrical extension of the nut, said cylindrical extension thereby forming a protecting-casing for the interlocking shoulder or shoulders and lug or lugs.

2. In a pipe-coupling, the combination, of a section provided with threads, a locking-nut engaging the threads, said nut provided with a shoulder, or with shoulders, another section telescoping into the first-named section, a locking-collar loose on the telescoping section, said collar provided with a lug, or with lugs, adapted to be engaged by the shoulder, or shoulders, of the nut, and a detent connected to the collar and adapted for engagement with a notch in the telescoping section.

3. In a pipe-coupling, the combination, of a section provided with threads, a locking-nut engaging the threads, said nut provided upon one face with a notch, another section telescoping into the first-named section, a locking-collar on the telescoping section, said locking-collar and locking-nut provided respectively with a lug, or with lugs, and with a shoulder, or with shoulders adapted to interlock, and a dog or bolt adapted to automatically engage the notch of the nut when the shoulder or shoulders and the lug or lugs are out of engagement.

In testimony whereof I affix my signature in presence of two witnesses.

NICHOLAS J. MOEHN.

Witnesses:
ARTHUR L. MORSELL,
ANNA V. FAUST.